(12) United States Patent
McMahan et al.

(10) Patent No.: US 8,353,165 B2
(45) Date of Patent: Jan. 15, 2013

(54) COMBUSTOR ASSEMBLY FOR USE IN A TURBINE ENGINE AND METHODS OF FABRICATING SAME

(75) Inventors: Kevin Weston McMahan, Greer, SC (US); Ronald James Chila, Greer, SC (US)

(73) Assignee: General Electric Company, Schenectady, NY (US)

( * ) Notice: Subject to any disclaimer, the term of this patent is extended or adjusted under 35 U.S.C. 154(b) by 68 days.

(21) Appl. No.: 13/030,436

(22) Filed: Feb. 18, 2011

(65) Prior Publication Data
US 2012/0210720 A1 Aug. 23, 2012

(51) Int. Cl.
*F23R 3/60* (2006.01)
(52) U.S. Cl. ............... 60/796; 60/752; 60/758; 60/760; 60/800; 431/160; 431/352
(58) Field of Classification Search ............ 60/752–758, 60/760, 39.37, 772, 796, 800; 431/10, 351, 431/352, 160
See application file for complete search history.

(56) References Cited

U.S. PATENT DOCUMENTS

| | | | |
|---|---|---|---|
| 4,465,284 A | 8/1984 | Szema | |
| 5,414,999 A | 5/1995 | Barnes | |
| 5,724,816 A | 3/1998 | Ritter et al. | |
| 6,484,505 B1 | 11/2002 | Brown et al. | |
| 6,681,578 B1 | 1/2004 | Bunker | |
| 6,684,620 B2 | 2/2004 | Tiemann | |
| 6,751,962 B1* | 6/2004 | Kuwabara et al. | 60/800 |
| 6,761,031 B2 | 7/2004 | Bunker | |
| 6,769,257 B2 | 8/2004 | Kondo et al. | |
| 7,010,921 B2 | 3/2006 | Intile et al. | |
| 7,574,865 B2 | 8/2009 | Bland | |
| 2009/0094986 A1* | 4/2009 | Bottcher et al. | 60/752 |

OTHER PUBLICATIONS

Philip G. Hill, Carl R. Peterson, Mechanics and Thermodynamics of Propulsion, 1965, Addison-Wesley Publishing, p. 296.*

\* cited by examiner

*Primary Examiner* — William H Rodriguez
*Assistant Examiner* — Steven Sutherland
(74) *Attorney, Agent, or Firm* — Armstrong Teasdale LLP (57) ABSTRACT

A combustor assembly that includes a casing that includes a plenum, a combustor liner positioned within the plenum and defining a combustion chamber there within, and a transition piece that includes a forward portion that is coupled to the combustion liner and an aft portion that extends from the forward portion. The aft portion includes a transition piece frame. The transition piece frame includes an upstream surface, a downstream surface, and a radially inner surface extending between the upstream and downstream surfaces. The radially inner surface includes a leading edge that extends between the radially inner surface and the upstream surface. A plurality of first cooling passages extend from the upstream surface to the downstream surface. Each of the first cooling passages is oriented obliquely with respect to the leading edge from the upstream surface towards the downstream surface.

20 Claims, 5 Drawing Sheets

COMBUSTOR ASSEMBLY FOR USE IN A TURBINE ENGINE AND METHODS OF FABRICATING SAME

BACKGROUND OF THE INVENTION

The subject matter described relates generally to turbine engines and more particularly, to combustor assemblies for use with turbine engines.

At least some known gas turbine engines include a combustion assembly that is coupled to a turbine section. At least some known combustion assemblies include a combustor liner that is coupled to a transition piece. The transition piece is coupled to the turbine section with a transition piece frame assembly. In general, known gas turbine engines use cooling air to cool a combustion assembly included within the engine. Often cooling air is supplied from a compressor that is coupled in flow communication upstream from the combustion assembly. More specifically, in at least some known turbine engines, cooling air is discharged from the compressor into a plenum that extends at least partially around the transition piece of the combustor assembly. A portion of the cooling air entering the plenum is supplied to an impingement sleeve that circumscribes the transition piece, prior to the air being channeled into a channel defined between the impingement sleeve and the transition piece. Cooling air entering the channel is discharged downstream into a second channel defined between a combustor liner and a flowsleeve.

A portion of cooling air entering the cooling channel is channeled towards transition piece frame assembly. At least some known transition piece frame assemblies include a plurality of cooling passages that channel cooling air through the transition piece frame assembly in a non-uniform air flow pattern. However, the non-uniform flow distribution may create temperature variations throughout the transition piece frame assembly and may cause an uneven heat transfer between the transition piece frame assembly and the cooling air. Over time, the uneven heat transfer may result in thermal cracking and/or damage to the transition piece frame assembly. Over time continued operation with a damaged transition piece frame assembly may reduce the useful life of the transition piece frame assembly and/or increase the cost of maintaining and operating the turbine engine.

BRIEF DESCRIPTION OF THE INVENTION

In one aspect, a combustor assembly is provided. The combustor assembly includes a combustor liner that defines a combustion chamber there within and a transition piece that includes a forward portion that is coupled to the combustion liner and an aft portion that extends from the forward portion. The aft portion includes a transition piece frame. The transition piece frame includes an upstream surface, a downstream surface, and a radially inner surface extending between the upstream and downstream surfaces. The radially inner surface includes a leading edge that extends between the radially inner surface and the upstream surface. A plurality of first cooling passages extend from the upstream surface to the downstream surface. Each of the first cooling passages is oriented obliquely with respect to the leading edge from the upstream surface towards the downstream surface.

In another aspect, a turbine engine is provided. The turbine engine includes a compressor, and a combustor that is in flow communication with the compressor to receive at least some fluid discharged by the compressor. The combustor includes a plurality of combustor assemblies. At least one of the combustor assemblies includes a casing that includes a plenum. A combustor liner assembly is coupled to the casing. The combustion liner is at least partially positioned within the plenum and defines a combustion chamber therein. A transition piece includes a forward portion that is coupled to the combustion liner and an aft portion that extends from the forward portion. The aft portion includes a transition piece frame. The transition piece frame includes an upstream surface, a downstream surface, and a radially inner surface that extends between the upstream surface and the downstream surface. The radially inner surface includes a leading edge that extends between the radially inner and upstream surfaces. A plurality of first cooling passages extend from the upstream surface to the downstream surface. Each of the first cooling passages is oriented obliquely with respect to the leading edge.

In a further aspect, a method of fabricating a combustor assembly for use in a turbine engine is provided. The method includes coupling a combustor liner assembly to a casing such that the combustion liner is at least partially positioned within the casing to define a combustion chamber therein. A transition piece that includes a transition piece frame is formed. The transition piece frame includes an upstream surface, a downstream surface, and a radially inner surface that extends between the upstream and downstream surfaces. The radially inner surface includes a leading edge that extends between the radially inner surface and the upstream surface. A plurality of first cooling passages is defined through the transition piece frame. Each of the first cooling passages extends from the upstream surface towards the downstream surface and is oriented at a first oblique angle with respect to the leading edge. The transition piece is coupled to the combustor liner for channeling combustion gases from the combustion chamber to a turbine section.

DETAILED DESCRIPTION OF THE INVENTION

The exemplary methods and systems described herein overcome at least some disadvantages of known combustor assemblies by providing a transition piece frame that channels a substantially uniform flow distribution of cooling fluid through the transition piece frame to facilitate enhanced heat transfer between the cooling fluid and the transition piece frame. More specifically, the embodiments described herein provide a transition piece frame that includes a cooling passage that enables a flow of cooling fluid having a uniform distribution to be channeled through the transition piece frame. The uniform distribution of cooling fluid facilitates substantially evenly reducing a temperature of the transition piece frame, which facilitates increasing the operating life of the combustor assembly.

As used herein, the term "upstream" refers to a forward end of a turbine engine, and the term "downstream" refers to an aft end of a turbine engine.

Figure 1:
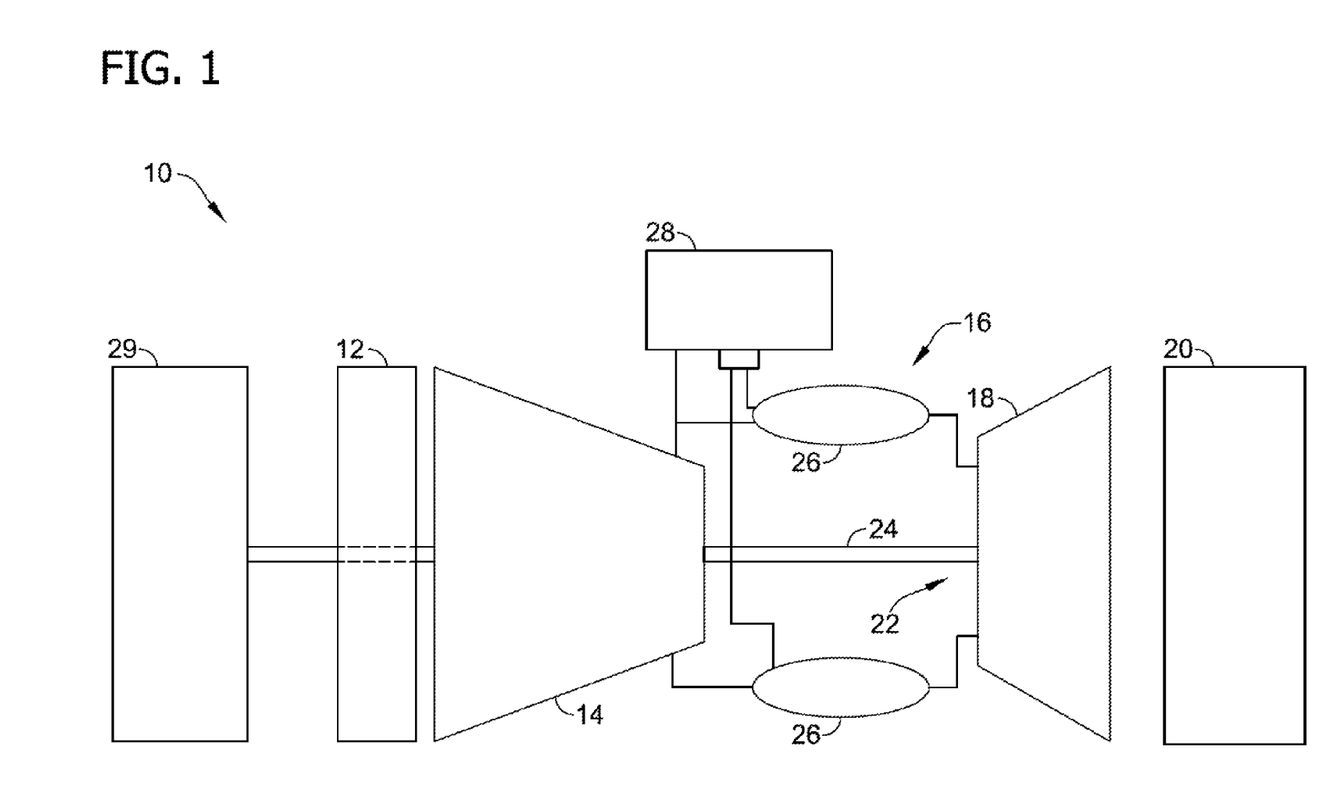
FIG. 1 is a schematic cross-sectional illustration of an exemplary turbine engine.

FIG. 1 is a schematic view of an exemplary turbine engine 10. Turbine engine 10 includes an intake section 12, a compressor section 14 that is downstream from intake section 12, a combustor section 16 downstream from compressor section 14, a turbine section 18 downstream from combustor section 16, and an exhaust section 20 downstream from turbine section 18. Turbine section 18 is coupled to compressor section 14 via a rotor assembly 22 that includes a shaft 24. Combustor section 16 includes a plurality of combustor assemblies 26 that are each coupled in flow communication with the compressor section 14. A fuel nozzle assembly 28 is coupled to each combustor assembly 26. Turbine section 18 is rotatably coupled to compressor section 14 and to a load 29 such as, but not limited to, an electrical generator and/or a mechanical drive application. In one embodiment, turbine engine 10 is a MS9001E engine, commercially available from General Electric Company, Schenectady, N.Y. It should be noted that turbine engine 10 is exemplary only, and that the present invention is not limited to being used only with turbine engine 10, but rather may instead be implemented within any turbine engine that functions as described herein.

During operation, air flows through compressor section 14 and compressed air is discharged into combustor section 16. Combustor assembly 26 injects fuel, for example, natural gas and/or fuel oil, into the air flow, ignites the fuel-air mixture to expand the fuel-air mixture through combustion, and generates high temperature combustion gases. Combustion gases are discharged from combustor assembly 26 towards turbine section 18 wherein thermal energy in the gases is converted to mechanical rotational energy. Combustion gases impart rotational energy to turbine section 18 and to rotor assembly 22, which subsequently provides rotational power to compressor section 14.

Figure 2:
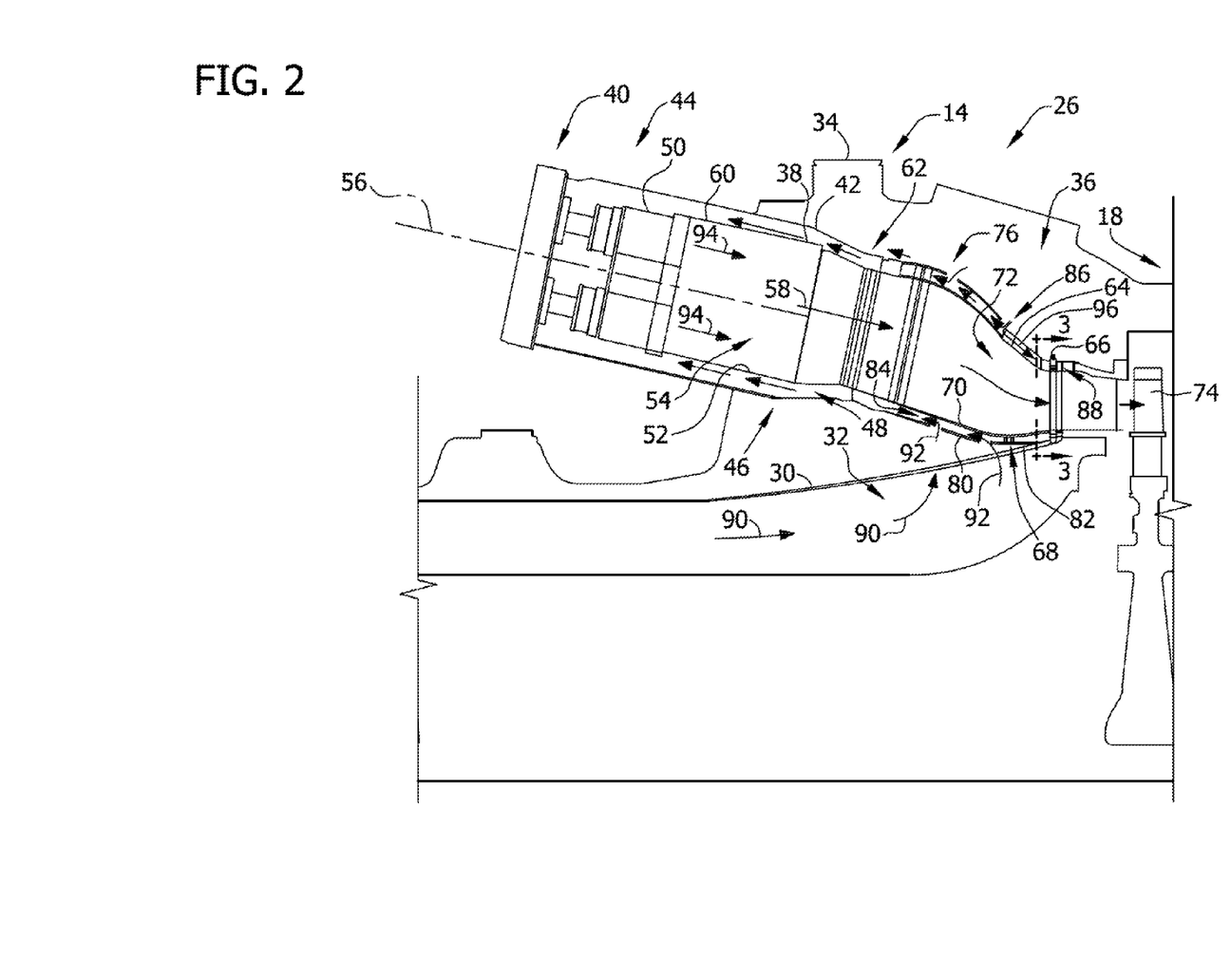
FIG. 2 is an enlarged cross-sectional illustration of a portion of an exemplary combustor assembly that may be used with the turbine engine shown in FIG. 1.

FIG. 2 is an enlarged cross-sectional illustration of a portion of combustor assembly 26. In the exemplary embodiment, combustor assembly 26 is coupled in flow communication with turbine section 18 and with compressor section 14. Moreover, in the exemplary embodiment, compressor section 14 includes a diffuser 30 that is coupled in flow communication with a discharge plenum 32 that enables air to be channeled downstream from compressor section 14 towards combustor assembly 26.

In the exemplary embodiment, combustor assembly 26 includes a combustor casing 34 that defines a chamber 36 therein and a combustor liner 38 that is positioned within chamber 36. A dome plate 40 is coupled to a substantially cylindrical combustor flowsleeve 42 that includes a forward section 44 and an aft section 46. Flowsleeve 42 is coupled to combustor casing 34 and is at least partially positioned within chamber 36. Combustor liner 38 is positioned within flowsleeve 42 and is supported by, flowsleeve 42. More specifically, in the exemplary embodiment, flowsleeve 42 is coupled radially outwardly from combustor liner 38 such that an annular cooling passage 48 is defined between flowsleeve 42 and combustor liner 38. Flowsleeve 42 and combustor casing 34 substantially isolate combustor liner 38 and its associated combustion processes from surrounding turbine components. A dome plate 40 is coupled to forward section 44 of flowsleeve 42 to support a plurality of fuel nozzles 50 that are positioned within flowsleeve 42.

In the exemplary embodiment, combustor liner 38 includes a substantially cylindrically-shaped inner surface 52 that defines an annular combustion chamber 54 that has a centerline axis 56 extending therethrough. Combustor liner 38 is also coupled to fuel nozzles 50 that channel fuel into combustion chamber 54. Combustion chamber 54 defines a combustion gas flow path 58 that extends from fuel nozzles 50 to turbine section 18. Annular cooling passage 48 channels cooling fluid across an outer surface 60 of combustor liner 38 towards fuel nozzles 50. In the exemplary embodiment, flowsleeve 42 includes an inlet opening 62 that defines a flow path into cooling passage 48.

A transition piece 64 is coupled to combustor liner 38 for use in channeling combustion gases from combustor liner 38 towards turbine section 18. In the exemplary embodiment, transition piece 64 includes a transition piece frame 66 that extends from a downstream portion, i.e. an aft portion 68 of transition piece 64. In the exemplary embodiment, transition piece frame 66 is formed integrally with transition piece 64. In an alternative embodiment, transition piece frame 66 is coupled to transition piece 64 with a weld, a fastener, a bolt, and/or any other suitable method to coupled transition piece frame 66 to transition piece 64 to enable transition piece frame 66 to function as described herein.

In the exemplary embodiment, transition piece 64 includes an inner surface 70 that defines a guide cavity 72 that channels combustion gases from combustion chamber 54 downstream to a turbine nozzle 74. Combustion gases generated within combustion chamber 54 are channeled along path 58 towards transition piece 64. An upstream portion, i.e. a forward portion 76 of transition piece 64 is coupled to liner aft section 46. In one embodiment, combustor liner 38 is at least partially inserted into forward portion 76 such that combustion chamber 54 is positioned in flow communication with guide cavity 72, and such that combustion chamber 54 and guide cavity 72 are substantially isolated from plenum 32. In the exemplary embodiment, aft portion 68 of transition piece 64 extends from forward portion 76 such that transition piece frame 66 is positioned adjacent turbine nozzle 74. In one embodiment, transition piece frame 66 is coupled to casing 34 to support transition piece frame 66 from casing 34. Alternatively, forward portion 76 of transition piece frame 66 is couple to casing 34.

In the exemplary embodiment, an impingement sleeve 80 is spaced a distance radially outwardly from transition piece 64. More specifically, a downstream end 82 of impingement sleeve 80 is coupled to transition piece frame 66 such that impingement sleeve 80 is positioned radially outwardly from transition piece 64 such that a transition piece cooling passage 84 is defined between impingement sleeve 80 and transition piece 64. A plurality of openings 86 extending through impingement sleeve 80 enable a portion of air flow from compressor discharge plenum 32 to be channeled into cooling passage 84.

A plurality of cooling passages 88 are defined within transition piece frame 66. Each cooling passage 88 is sized and shaped to channel a portion of air flow from compressor discharge plenum 32 through cooling passage 88 to facilitate reducing a temperature of transition piece frame 66.

During operation, compressor section 14 is driven by turbine section 18 via shaft 24 (shown in FIG. 1). As compressor section 14 rotates, compressed air 90 is discharged into diffuser 30. In the exemplary embodiment, the majority of compressed air 90 discharged from compressor section 14 into diffuser 30 is channeled through compressor discharge plenum 32 towards combustor assembly 26. A first flow 92 of pressurized compressed air 90 within plenum 32 is channeled into cooling passage 84 through impingement sleeve openings 86. Air 90 entering cooling passage 84 is then discharged from cooling passage 84 towards fuel nozzles 50. Air 90 is then mixed with fuel discharged from fuel nozzles 50 and ignited within combustion chamber 54 to form a combustion gas stream 94. Combustion gases 94 are channeled from chamber 54 through transition piece guide cavity 72 towards turbine nozzle 74. A second flow 96 of pressurized compressed air 90 within plenum 32 is channeled from cooling passage 84 towards transition piece frame 66 and into cooling passages 88. Air 90 entering cooling passages 88 facilitates reducing a temperature of transition piece 64 during operation of combustor assembly 26.

Figure 3:
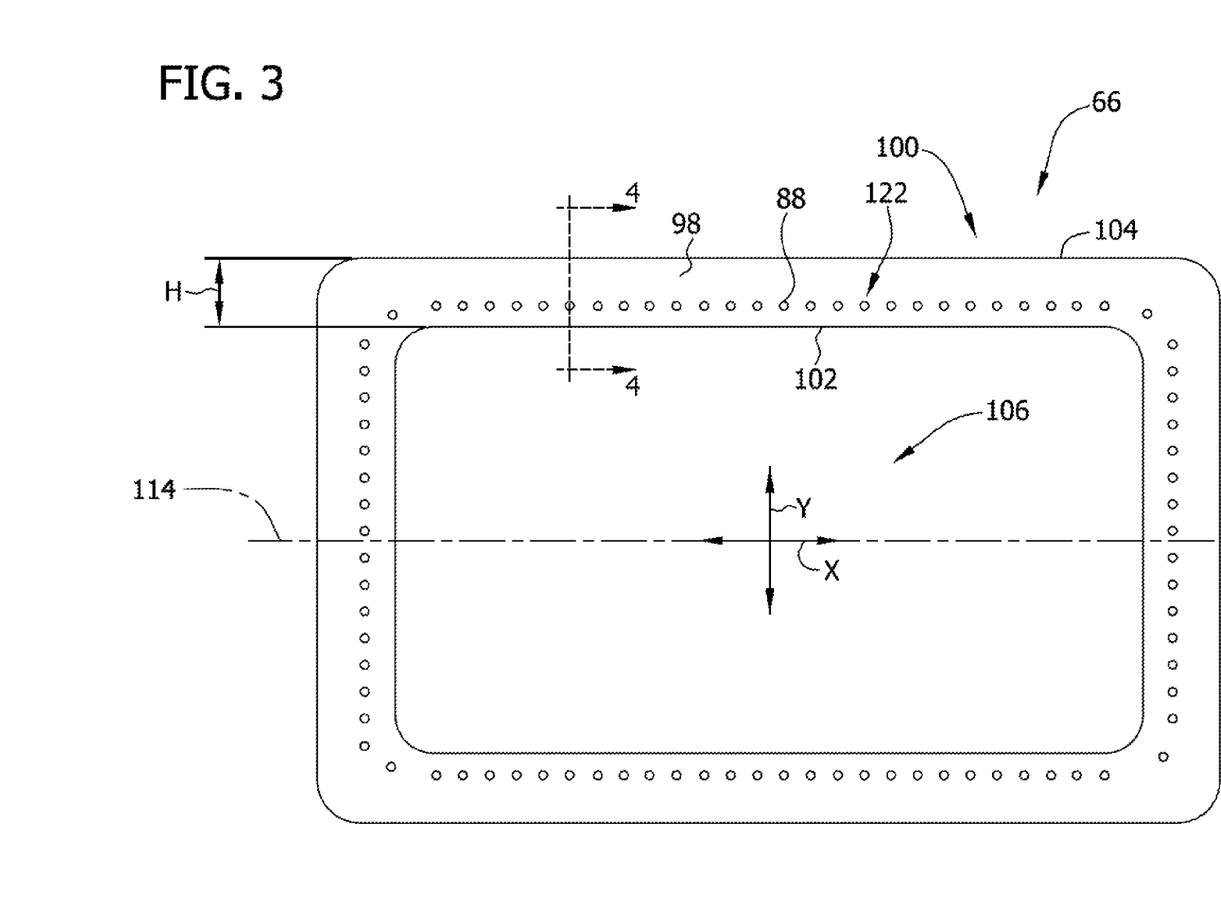
FIG. 3 is a cross-sectional view of an exemplary transition piece frame that may be used with the combustor assembly shown in FIG. 2 and taken along line 3-3.
Figure 4:
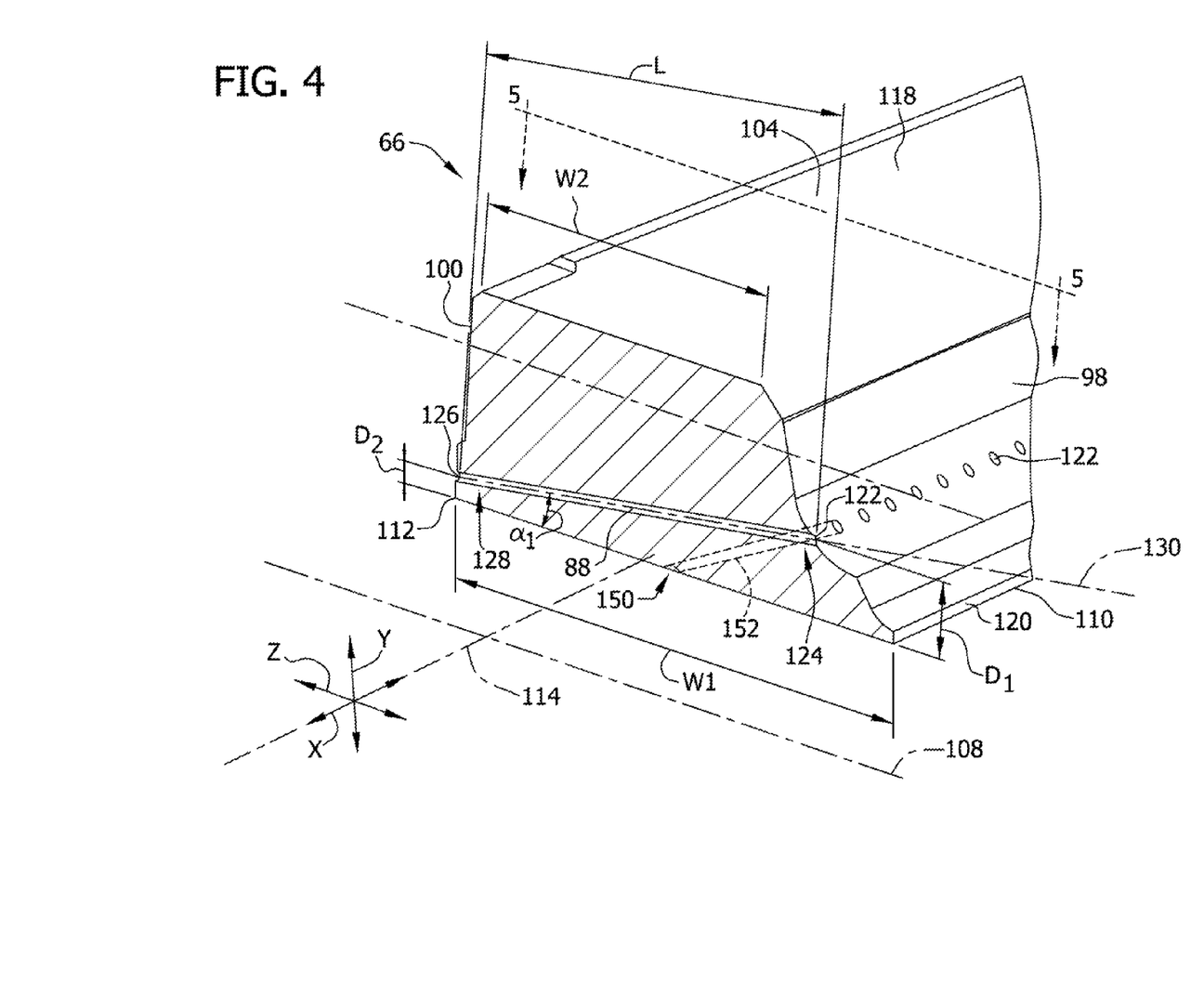
FIG. 4 is a partial cross-sectional view of the transition piece shown in FIG. 3 and taken along line 4-4.
Figure 5:
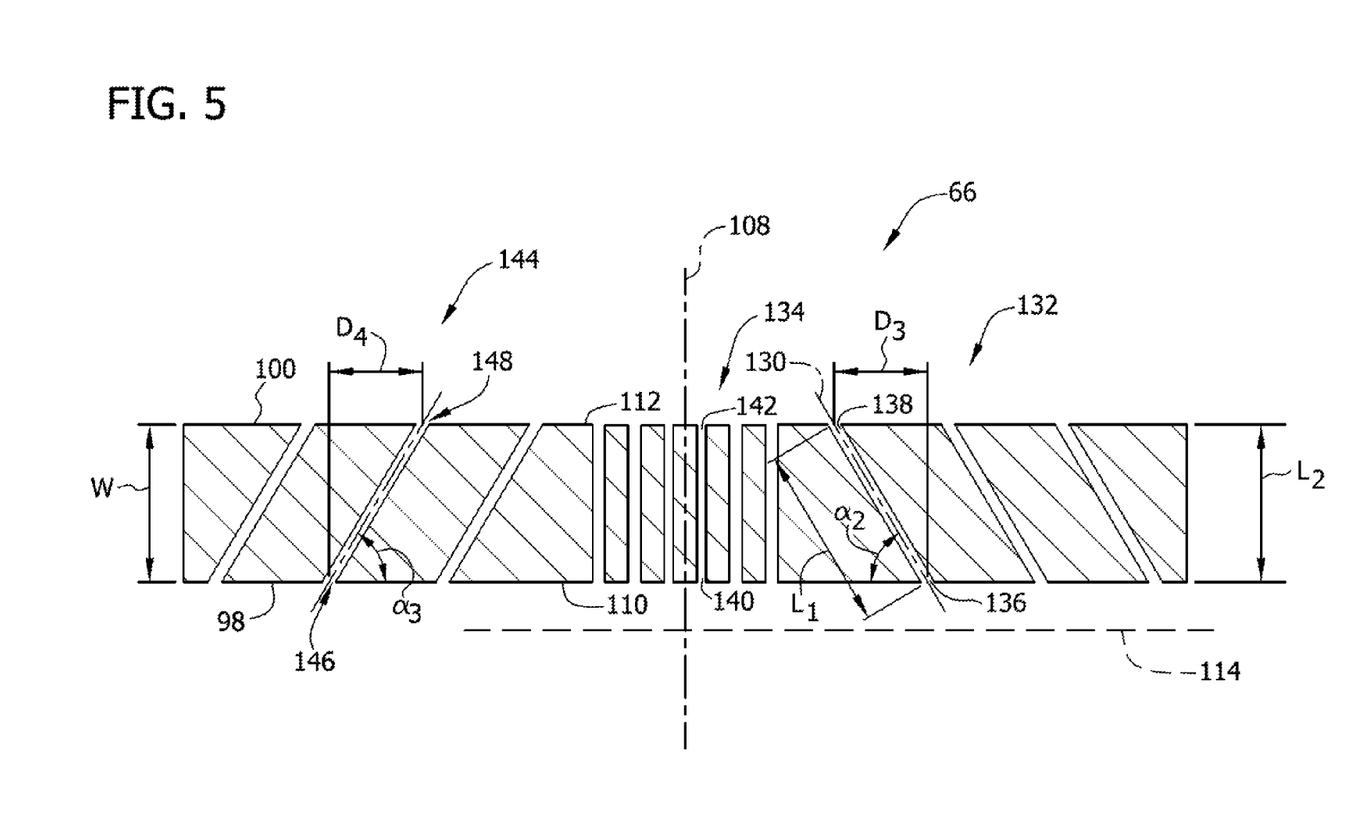
FIG. 5 is a partial cross-sectional view of the transition piece shown in FIG. 4 and taken along line 5-5.

FIG. 3 is a sectional view of an exemplary embodiment of transition piece frame 66 shown in FIG. 2 and taken along line 3-3. FIG. 4 is a partial cross-sectional view of transition piece frame 66 and taken along line 4-4. FIG. 5 is a partial cross-sectional view of transition piece frame 66 and taken along line 5-5. In the exemplary embodiment, transition piece frame 66 includes an upstream surface 98, downstream surface 100, a radially inner surface 102, and a radially outer surface 104. Upstream surface 98 is spaced a distance from downstream surface 100, and surfaces 102 and 104 each extend generally axially between surfaces 98 and 100. Radially inner surface 102 defines an inner cavity 106 that extends along a centerline axis 108. In the exemplary embodiment, cavity 106 has a substantially rectangular shape that at least partially defines combustion gas flow path 58 and that provides flow communication between transition piece guide cavity 72 and turbine section 18. More specifically, in the exemplary embodiment, transition piece frame 66 has a height H that is defined between surfaces 102 and 104, and an axial width W that is defined between surfaces 98 and 100.

In the exemplary embodiment, inner surface 102 extends between a leading edge 110 and a trailing edge 112. Leading edge 110 extends between radially inner surface 102 and upstream surface 98. Trailing edge 112 extends between radially inner surface 102 and downstream surface 100. Edges 110 and 112 are oriented substantially perpendicular with respect to centerline axis 108. Moreover, in the exemplary embodiment, edges 110 and 112 define a transverse axis 114 that is perpendicular to centerline axis 108.

In the exemplary embodiment, upstream surface 98 includes a projection 120 that extends outwardly from upstream surface 98 towards transition piece 64. Projection 120 is sized, shaped, and oriented to facilitate coupling transition piece 64 to transition piece frame 66. In the exemplary embodiment, a first axial width $W_1$ of radially inner surface 102 is larger than a second axial width $W_2$ of radially outer surface 104.

In the exemplary embodiment, axes X, Y, and Z each extend substantially perpendicularly through transition piece frame 66 and are oriented to define a three-dimensional Cartesian coordinate system that is oriented such that the Z-axis is aligned substantially coaxially with centerline axis 108, and such that the X-axis is substantially coaxial with transverse axis 114. In the exemplary embodiment, transition piece frame 66 includes a plurality of cooling passages 88 that extend from upstream surface 98 towards downstream surface 100. Upstream surface 98 includes a plurality of upstream openings 122 defined therein that provide flow communication between cooling passage 88 and plenum 32. Downstream surface 100 includes a plurality of downstream openings 126 defined therein that provide flow communication between plenum 32 and turbine section 18. In the exemplary embodiment, each cooling passage 88 extends between opening 122 and downstream opening 126 and defines a longitudinal axis 130 that extends between upstream opening 122 and downstream opening 126. Each cooling passage 88 has an axial length L measured between upstream opening 122 and downstream opening 126 and along longitudinal axis 130. Cooling passage 88 is sized and shaped to channel cooling fluid from plenum 32 through transition piece 64 towards turbine section 18 to facilitate cooling transition piece 64. Cooling passage 88 extends from upstream opening 122 to downstream opening 126 and is oriented at a first oblique angle $\alpha_1$ with respect to radially inner surface 102.

Referring to FIG. 4, in the exemplary embodiment, openings 122 are defined at a first radial distance $D_1$ from radially inner surface 102, and downstream openings 126 are defined at a second radial distance $D_2$ from radially inner surface 102. In the exemplary embodiment, distance $D_2$ is shorter than distance $D_1$. In one embodiment, second radial distance $D_2$ is approximately the same length as first radial distance $D_1$ such that each cooling passage 88 is oriented substantially parallel to radially inner surface 102 and/or to centerline axis 108. Alternatively, second radial distance $D_2$ may be longer than first radial distance $D_1$.

Referring to FIG. 5, in the exemplary embodiment, transition piece frame 66 includes at least one first cooling passage 132 and at least one second cooling passage 134. First cooling passage 132 extends from a first upstream opening 136 to a first downstream opening 138. In the exemplary embodiment, first downstream opening 138 is offset a circumferential distance $D_3$ along transverse axis 114 with respect to first upstream opening 136. First cooling passage 132 extends between first upstream opening 136 and first downstream opening 138, and is oriented at a second oblique angle $\alpha_2$ with respect to leading edge 110. Second cooling passage 134 extends between a second upstream opening 140 and a second downstream opening 142, and is oriented substantially perpendicularly to leading edge 110. In the exemplary embodiment, first cooling passage 132 has a first axial length $L_1$ measured between first upstream opening 136 and first downstream opening 138. Second cooling passage 134 has a second axial length $L_2$ measured between second upstream opening 140 and second downstream opening 142. In the exemplary embodiment, length $L_2$ is shorter than length $L_1$.

In one embodiment, transition piece frame 66 includes at least one third cooling passage 144 that extends between a third upstream opening 146 and a third downstream opening 148. Third downstream opening 148 is offset a circumferential distance $D_4$ with respect to third upstream opening 146 such that third cooling passage 144 is oriented at a third oblique angle $\alpha_3$, with respect to leading edge 110, that is different than second oblique angle $\alpha_2$. In one embodiment, third cooling passage 144 is oriented in a mirrored relationship with first cooling passage 132.

In the exemplary embodiment, radially inner surface 102 includes at least one opening 150. Moreover, in the exemplary embodiment, at least one cooling passage 152 extends between upstream opening 122 and opening 150 to provide flow communication between plenum 32 and combustion gas flow path 58 to facilitate cooling transition piece 64 and radially inner surface 102.

In the exemplary embodiment, during operation of turbine engine 10, cooling air is discharged from plenum 32 into flowsleeve 42 and impingement sleeve 80. Moreover, flow 92 enters transition piece cooling passage 84 through openings 86 to facilitate cooling transition piece 64 as flow 92 moves through transition piece cooling passage 84. Transition piece cooling passage 84 channels second flow 96 through transition piece frame 66 towards cooling passages 88. Cooling passages 88 channel second flow 96 from plenum 32 to turbine section 18 to facilitate heat transfer between transition piece frame 66 and cooling fluid to reduce a temperature of transition piece frame 66.

The orientation and length of cooling passages 88 is selected to facilitate a substantially uniform flow distribution of cooling fluid through transition piece frame 66. The uniform cooling flow distribution facilitates enhancing heat transfer between transition piece frame 66 and the cooling fluid channeled through cooling passage 88, and facilitates reducing damage to downstream surface 100 caused by overcooling downstream surface 100.

The above-described apparatus and methods overcome at least some disadvantages of known combustor assemblies by providing a transition piece frame that channels a substantially uniform flow distribution of cooling fluid through the transition piece frame to facilitate enhanced heat transfer between the cooling fluid and the transition piece frame. More specifically, by providing a transition piece frame that includes cooling passages that are oriented obliquely with respect to a centerline axis of the transition piece frame, the cooling fluid is channeled through passages that are longer than known transition piece frame cooling passages. As such, the contact time between the cooling fluid and the transition piece is increased, such that an amount of heat transfer is also increased, which facilitates increasing the operating life of the combustor assembly. As such, the cost of maintaining the gas turbine engine system is facilitated to be reduced.

Exemplary embodiments of a combustor assembly for use in a turbine engine and methods for assembling the same are described above in detail. The methods and apparatus are not limited to the specific embodiments described herein, but rather, components of systems and/or steps of the method may be utilized independently and separately from other components and/or steps described herein. For example, the methods and apparatus may also be used in combination with other combustion systems and methods, and are not limited to practice with only the turbine engine assembly as described herein. Rather, the exemplary embodiment can be implemented and utilized in connection with many other combustion system applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A combustor assembly comprising:
   a combustor liner defining a combustion chamber there within;
   a transition piece comprising a forward portion coupled to said combustion liner and an aft portion extending from said forward portion, said aft portion comprising a transition piece frame, said transition piece frame comprising:
      an upstream surface, a downstream surface, and a radially inner surface extending between said upstream and downstream surfaces, said radially inner surface comprises a leading edge extending between said radially inner surface and said upstream surface; and
      a plurality of first cooling passages extending from said upstream surface to said downstream surface, each of said first cooling passages oriented obliquely with respect to said leading edge from the upstream surface towards the downstream surface; and
   an impingement sleeve coupled to the transition piece frame and defining at least one transition piece cooling passage extending between the transition piece and the impingement sleeve, the at least one transition piece cooling passage is coupled in flow communication with said plurality of first cooling passages.

2. A combustor assembly in accordance with claim 1, wherein each of said first cooling passages is oriented at an oblique angle with respect to said radially inner surface from the upstream surface towards the downstream surface.

3. A combustor assembly in accordance with claim 1, wherein said transition piece frame further comprises a plurality of second cooling passages extending between said upstream surface and said downstream surface, each of said second cooling passages is oriented substantially perpendicularly to said leading edge.

4. A combustor assembly in accordance with claim 3, wherein said transition piece frame further comprises a plurality of third cooling passages extending between said upstream surface and said radially inner surface.

5. A combustor assembly in accordance with claim 1, wherein said first cooling passage extends between an upstream opening defined in said upstream surface and a downstream opening defined in said downstream surface, said downstream opening offset a circumferential distance from said upstream opening.

6. A combustor assembly in accordance with claim 5, wherein said upstream opening is positioned a first radial distance from said radially inner surface, said downstream opening positioned a second radial distance from said radially inner surface that is shorter than said first radial distance.

7. A combustor assembly in accordance with claim 1, wherein said transition piece frame further comprises a first cooling passage oriented at a first oblique angle with respect to said leading edge and a second cooling passage oriented at a second oblique angle with respect to said leading edge that is different than the first oblique angle.

8. A turbine engine comprising:
   a compressor; and
   a combustor in flow communication with said compressor to receive at least some fluid discharged by said compressor, said combustor comprising a plurality of combustor assemblies, at least one of said combustor assemblies comprising:
      a casing comprising a plenum;
      a combustor liner assembly coupled to said casing, said combustion liner at least partially positioned within said plenum and defining a combustion chamber therein; and
      a transition piece comprising a forward portion coupled to said combustion liner and an aft portion extending from said forward portion, said aft portion comprising a transition piece frame, said transition piece frame comprising:
         an upstream surface, a downstream surface, and a radially inner surface extending between said upstream surface and said downstream surface, said radially inner surface comprises a leading edge extending between said radially inner and upstream surfaces; and a plurality of first cooling passages extending from said upstream surface to said downstream surface, each of said first cooling passages oriented obliquely with respect to said leading edge; and an impingement sleeve coupled to the transition piece frame and defining at least one transition piece cooling passage extending between the transition piece and the impingement sleeve, the at least one transition piece cooling passage is coupled in flow communication with the plurality of first cooling passages.

9. A turbine engine in accordance with claim 8, wherein each of said first cooling passages extends between said upstream surface and said downstream surface at an oblique angle with respect to said radially inner surface.

10. A turbine engine in accordance with claim 8, wherein said transition piece frame further comprises a plurality of second cooling passages extending between said upstream surface and said downstream surface, each of said second cooling passages is oriented substantially perpendicularly to said leading edge.

11. A turbine engine in accordance with claim 10, wherein said transition piece frame further comprises a plurality of third cooling passages extending between said upstream surface and said radially inner surface.

12. A turbine engine in accordance with claim 8, wherein said first cooling passage extends between an upstream opening defined in said upstream surface and a downstream opening defined in said downstream surface, said downstream opening offset a circumferential distance from said upstream opening.

13. A turbine engine in accordance with claim 12, wherein said upstream opening is positioned a first radial distance from said radially inner surface, said downstream opening positioned a second radial distance from said radially inner surface that is shorter than said first radial distance.

14. A turbine engine in accordance with claim 13, wherein said transition piece frame further comprises a first cooling passage oriented at a first oblique angle with respect to said leading edge and a second cooling passage oriented at a second oblique angle with respect to said leading edge that is different than the first oblique angle.

15. A method of fabricating a combustor assembly for use in a turbine engine, said method comprising:

coupling a combustor liner assembly to a casing such that the combustion liner is at least partially positioned within the casing to define a combustion chamber therein;

forming a transition piece including a transition piece frame, the transition piece frame including an upstream surface, a downstream surface, and a radially inner surface extending between the upstream and downstream surfaces, the radially inner surface including a leading edge extending between the radially inner surface and the upstream surface;

defining a plurality of first cooling passages through the transition piece frame, each of the first cooling passages extending from the upstream surface towards the downstream surface and oriented at a first oblique angle with respect to the leading edge;

coupling the transition piece to the combustor liner for channeling combustion gases from the combustion chamber to a turbine section; and coupling an impingement sleeve to the transition piece frame and defining at least one transition piece cooling passage extending between the transition piece and the impingement sleeve, wherein the at least one transition piece cooling passage is coupled in flow communication with the plurality of first cooling passages.

16. A method in accordance with claim 15, further comprising defining a plurality of circumferentially-spaced upstream openings in the upstream surface, wherein each of the first cooling passages is coupled in flow communication with a respective upstream opening.

17. A method in accordance with claim 16, further comprising defining a plurality of circumferentially-spaced downstream openings in the downstream surface, wherein each of the first cooling passages extends between an upstream surface opening and a downstream surface opening.

18. A method in accordance with claim 16, further comprising defining a plurality of circumferentially-spaced openings through the radially inner surface, wherein at least one of the first cooling passages extends between an upstream surface opening and an inner surface opening.

19. A method in accordance with claim 16, further comprising defining a plurality of second cooling passages through the transition piece frame, each of the second cooling passages extending between the upstream surface and the downstream surface and oriented substantially perpendicular to the leading edge.

20. A method in accordance with claim 19, further comprising defining a plurality of third cooling passages through the transition piece frames, each of the third cooling passages extending from the upstream surface towards the downstream surface and oriented at a third oblique angle with respect to the leading edge.

* * * * *